Figure 1:
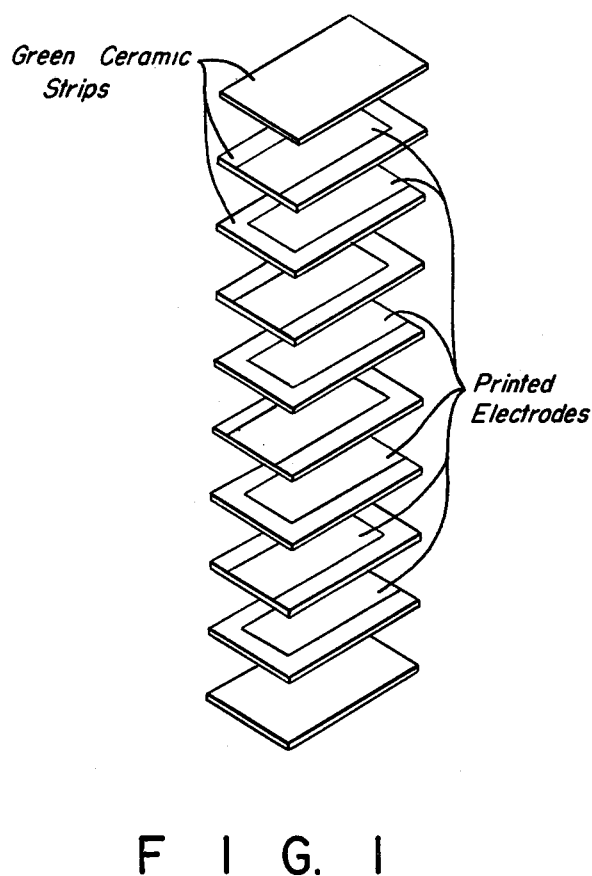

United States Patent [19]

Hanold, III

[11] 4,081,857

[45] Mar. 28, 1978

[54] LOW TEMPERATURE SINTERING CERAMIC CAPACITOR AND METHOD OF MAKING

[75] Inventor: R. C. Frederick Hanold, III, Greenville, S.C.

[73] Assignee: Union Carbide Corporation, New York, N.Y.

[21] Appl. No.: 722,627

[22] Filed: Sep. 13, 1976

Related U.S. Application Data

[63] Continuation of Ser. No. 536,660, Dec. 26, 1974, abandoned.

[51] Int. Cl.² .............................................. H01G 4/12
[52] U.S. Cl. .................................. 361/321; 29/25.42; 106/73.31
[58] Field of Search ........................ 106/73.31, 73.32; 317/258; 29/25.42; 361/321

[56] References Cited

U.S. PATENT DOCUMENTS

| | | | |
|---|---|---|---|
| 3,292,994 | 12/1966 | Yuss | 317/258 UX |
| 3,666,505 | 5/1972 | Hoffman | 106/73.31 |
| 3,682,766 | 8/1972 | Maher | 317/258 X |
| 3,699,044 | 10/1972 | Dosch | 317/258 UX |

OTHER PUBLICATIONS

Matkin, "The Preparation & Treatment of Ceramic Powders in Trant." Journal of British Ceramic Society, 167, vol. 72, 11/2/73.
Goswami, J. PHS Society, Japan, pp. 279–289 (1968).

*Primary Examiner*—E. A. Goldberg
*Attorney, Agent, or Firm*—Frederick J. McCarthy, Jr.

[57] ABSTRACT

Fired ceramic bodies, including ceramic capacitors, utilizing lead-free constituent materials fired at temperatures not higher than 1120° C.

9 Claims, 3 Drawing Figures

Green Ceramic Strips

Printed Electrodes

Stacked Capacitor Configuration

Monolithic Ceramic Capacitor

LOW TEMPERATURE SINTERING CERAMIC CAPACITOR AND METHOD OF MAKING

This application is a continuation of application Ser. No. 536,660 filed Dec. 26, 1974 now abandoned.

The present invention relates to fired ceramic bodies, such as monolithic ceramic capacitors, and to a method for making such bodies.

The materials commonly employed in the making of a fired ceramic body generally require firing to maturity at elevated temperatures above about 1120° C. Such temperatures preclude the use of relatively inexpensive low melting or reactive metals in combination with such ceramic bodies, thus requiring the use of high melting non-reactive metals such as platinum, palladium and gold for capacitor electrodes and precluding the use of less expensive metals.

It has been proposed to use complex oxide mixtures, and pre-fired ceramic material in combination with complex oxide mixtures to permit lower maturing temperatures. Such practices either tend to complicate the production of fired ceramic bodies, particularly monolithic ceramic capacitors, or do not provide a desired, stable, high dielectric constant material.

A fired ceramic body in accordance with the present invention is prepared by combining in the course of firing, lead-free, base ceramic material, e.g. barium titanate powder, with a lead-free cadmium oxide-containing ceramic material. The term "base ceramic material" as used herein includes lead-free titanates, niobates, zirconates, stannates, alumina, rare earth metal oxides and solid solutions and unfired mixtures of the foregoing with each other. Base ceramic material can include additions of minor amounts of other metal compounds known to the art. The term "cadmium oxide-containing ceramic material" as used herein includes CdO, mixtures of CdO with $Bi_2O_3$ containing at least about 30% by weight CdO and up to 70% by weight $Bi_2O_3$, and $CdO + Bi_2O_3$ glasses containing at least about 30% by weight CdO and up to 70% by weight $Bi_2O_3$ having a softening point in the range of about 700° to 900° C. The cadmium oxide containing ceramic material can also contain up to 30% by weight of known oxide glass formers.

In the practice of the present invention base ceramic material, in particulate form, is blended with particulated lead-free cadmium oxide-containing ceramic material in weight proportions of 60 to 95% base ceramic material, 5 to 40% lead-free cadmium oxide-containing ceramic material, and the resulting unreacted mechanical mixture, is conventionally formed into a green ceramic body by addition of fugitive or sacrificial slip forming and binder materials, e.g. a PVA water solution, glycerine, defluocculants, wetting agents. The green ceramic body is fired and matured at a temperature not higher than 1120° C. to provide a sound, dense ceramic body. The weight proportions of metals and oxygen in the matured ceramic body are the same as in the unfired mixtures.

An electrical device such as a monolithic ceramic capacitor can be provided in accordance with the present invention by locating metal electrodes within the green ceramic body prior to firing, the fired ceramic providing the dielectric of the capacitor. In making such capacitors, it has been found that the overall electrical properties of the capacitor are substantially enhanced with the use of base ceramic material in finely divided form, i.e. 2500 A and finer. Other types of ceramic capacitors, e.g. disc and tubular forms, can be provided in accordance with the present invention by first firing the green ceramic body and then applying the electrode material in conventional fashion.

Finely divided base ceramic powders, as noted above, can be prepared as described in co-pending U.S. patent application Ser. No. 481,321 and in "Preparation and Treatment of Ceramic Powder" Transactions and Journal of the British Ceramic Society 167, Vol 72, No. 2, 1973. Examples V to XIV hereinbelow, describe the method of patent application Ser. No. 481,321.

It is an object of the present invention to provide a ceramic body fired at a low temperature not higher than 1120° C.

It is another object of the present invention to provide an electrical device including a low temperature firing ceramic body and a low melting metal element.

It is a further object of the present invention to provide a method for producing ceramic bodies at low firing temperatures.

Figure 2:
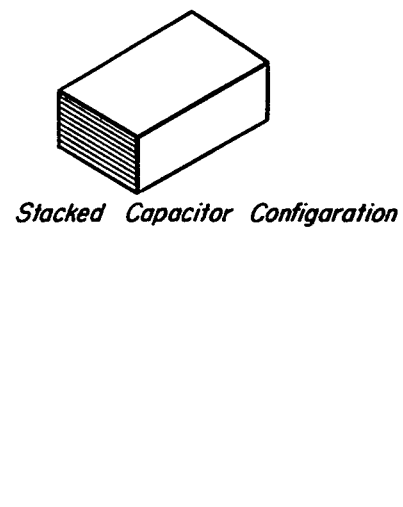
Figure 3:
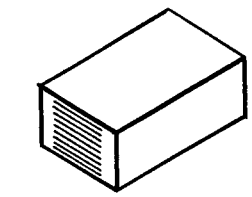

Other objects will be apparent from the following description and claims taken in conjunction with the drawing in which FIG. 1 shows green ceramic strips on which metal electrodes are printed;

FIG. 2 shows the green ceramic strips of FIG. 1 stacked in a capacitor configuration, and FIG. 3 shows the monolithic ceramic capacitor obtained after firing the configuration of FIG. 2.

The following Examples I to IV illustrate the present invention.

EXAMPLE I

Cadmium oxide, in the form of reagent grade powder* was blended with bismuth oxide, in the form of reagent grade powder**. The amount of CdO and $Bi_2O_3$ in the mixture were as follows:

CdO 54% by weight
$Bi_2O_3$ 46% by weight

*available from Fisher Scientific Co.
**available from Fisher Scientific Co.

The mixture was heated in a fire clay crucible in air to a temperature of about 1050° C to provide a molten mass which was subsequently solidified and crushed to −325 mesh (Tyler) sizes. The thus obtained lead-free cadmium oxide-containing ceramic glass material was mixed with commercial barium titanate powder (6000 A average particle size) and minor amounts of the other materials as indicated below, including solutions of grain growth inhibitors:

| | | |
|---|---|---|
| CdO + $Bi_2O_3$ Ceramic (54% CdO, 46% $Bi_2O_3$) | 20 | parts by wt. |
| Barium Titanate (6000 A) | 79.2 | parts by wt. |
| Calcium Stannate (1–5 microns) | 12 | parts by wt. |
| Bismuth Titanate (1–5 microns) | 11.8 | parts by wt. |
| Manganous Nitrate Solution (50% by weight $Mn(NO_3)_2$ in $H_2O$) | 0.2 | parts by wt. |
| Cobalt Nitrate ($Co(NO_3)_2 \cdot 6H_2O$) | 0.79 | parts by wt. |

Approximately equal parts by weight of the above mixture and 11% PVA-$H_2O$ solution were combined to conventionally form a slip which was cast to provide green ceramic tape about 2–2.5 mils thick. Rectangular electrode patterns (0.51 cm × 0.635 cm) were screen printed on green tape using a 50% Pd, 50% Ag ink. Portions of the green tape having electrode patterns were placed together and fired at 1040° C for 4 hours.

The resulting body was a sound, dense fired ceramic having a dielectric constant of 845.

EXAMPLE II

Cadmium oxide, in the form of reagent grade powder* was blended with bismuth oxide, in the form of reagent grade powder**. The amounts of CdO and $Bi_2O_3$ in the mixture were as follows:
  CdO 54% by weight
  $Bi_2O_3$ 46% by weight
*available from Fisher Scientific Co.
**available from Fisher Scientific Co.

The mixture was heated in a fire clay crucible in air to a temperature of about 1050° C to provide a molten mass which was subsequently solidified and crushed to −325 mesh (Tyler) sizes. The thus obtained lead-free cadmium oxide-containing ceramic glass material was mixed with very fine barium titanate powder≠ (1100 A average particle size) and minor amounts of the other materials as indicated below including solutions of grain growth inhibitors:
≠ produced by practice described in Example VII.

| | |
|---|---|
| CdO + $Bi_2O_3$ Ceramic (54% CdO, 46% $Bi_2O_3$) | 10.4 parts by wt. |
| Barium Titanate (1100 A) | 79.2 parts by wt. |
| Calcium Stannate (380 A) | 10 parts by wt. |
| Bismuth Titanate (980 A) | 11.88 parts by wt. |
| Manganous Nitrate Solution (50% by weight $Mn(NO_3)_2$ in $H_2O$) | 0.2 parts by wt. |
| Cobalt Nitrate ($Co(NO_3)_2 \cdot 6H_2O$) | 0.79 parts by wt. |

Approximately equal parts by weight of the above mixture and 11% PVA-$H_2O$ solution were combined to conventionally form a slip which was cast to provide green ceramic tape about 2–2.5 mils thick. Rectangular electrode patterns (0.51 cm × 0.635 cm) were screen printed on green tape using a 50% Pd, 50% Ag ink. Portions of the green tape having electrode patterns were placed together and fired at 1060° C for about 4 hours. The resulting body was a sound, dense fired ceramic having a dielectric constant of 1012.

EXAMPLE III

Cadmium oxide, in the form of reagent grade powder* was blended with bismuth oxide, in the form of reagent grade powder**. The amounts of CdO and $Bi_2O_3$ in the mixture were as follows:
  CdO 54% by weight
  $Bi_2O_3$ 46% by weight
*available from Fisher Scientific Co.
**available from Fisher Scientific Co.

The mixture was heated in a fire clay crucible in air to a temperature of about 1050° C to provide a molten mass which was subsequently solidified and crushed to −325 mesh (Tyler) sizes. The thus obtained lead-free cadmium oxide-containing ceramic glass material was mixed with very fine barium titanate powder (1100 A average particle size) as described in Example II and minor amounts of the other materials as indicated below including grain growth inhibitors:

| | |
|---|---|
| CdO + $Bi_2O_3$ Ceramic (54% CdO, 46% $Bi_2O_3$) | 20 parts by wt. |
| Barium Titanate (1100 A) | 79.2 parts by wt. |
| Calcium Stannate (500 A) | 12 parts by wt. |
| Bismuth Titanate (700 A) | 11.88 parts by wt. |
| Manganous Nitrate Solution (50% by weight $Mn(NO_3)_2$ in $H_2O$) | 0.2 parts by wt. |
| Cobalt Nitrate ($Co(NO_3)_2 \cdot 6H_2O$) | 0.79 parts by wt. |

Following conventional practice for making a monolithic multilayer ceramic capacitor approximately equal parts by weight of the above mixture and 11% PVA solution were combined to conventionally form a slip which was cast to provide green ceramic tape about 2–2.5 mils thick. Rectangular electrode patterns (0.51 cm × 0.635 cm) were screen printed on green tape using a 50% Pd, 50% Ag ink. The printed green ceramic tape was cut into strips as illustrated in FIG. 1 and stacked in a capacitor configuration as shown in FIG. 2 following conventional practice. The capacitor configuration was arranged to have 22 printed electrodes, i.e. 21 active dielectric layers.

The capacitor configuration was fired at 1090° C for about 4 hours. The resulting body was a sound, dense fired ceramic of the type shown in FIG. 3. The dielectric constant of the fired monolithic, multilayer capacitor was 850. Other measured electrical properties were:
  TC at −55° C = 13.7%
  TC = 125° C = 11.3%
  IR = 3K
  DF = 0.80%

TC, IR, DF, K and Life Test as used herein are defined as follows:

TC (Temperature Characteristic) is the change in capacitance with temperature expressed as the percent change in capacitance at −55° C and 125° C compared to the capacitance value at 25° C.

IR (Insulation Resistance) is a measure of the electrical resistance of the ceramic body (expressed herein in megohms) with 100 volts DC applied at 125° C.

DF in percent (Dissipation Factor) is the tangent of the loss angle of the dielectrical ceramic body multiplied by 100. DF is measured at 25° C unless otherwise specified.

K (Dielectric Constant) is that property of a dielectric which determines the electrostatic energy stored per unit volume for unit potential gradient. Expressed herein by $$K = 4.45 \, CT/A$$

where $C$ = capacitance in pico farads;
  $T$ = the dielectric thickness in inches and
  $A$ = the total electrode area in square inches.

Life Test is performed pursuant to the conditions of MIL-C-39014.

EXAMPLE IV

Base ceramic material in the form of particulated barium titanate admixed with other base ceramic materials, sometimes referred to in the art as modifiers, and in an unfired condition, was blended with various additions, including lead-free cadmium oxide and cadmium oxide-containing ceramic material in accordance with the present invention, prepared as described in Example I. The blended mixtures were formed into slips, cast, screen printed and fired following the procedure of Example I to produce mature ceramic bodies. The particular firing conditions for the data obtained are indicated in Table A. Electrical properties of the capacitor devices thus obtained were measured and are also shown in Table A together with general observations in some instances.

TABLE A

I

| | | Parts by wt. | Particle Sizing | TC | | IR | DF | | K | Life Test |
|---|---|---|---|---|---|---|---|---|---|---|
| Base Ceramic Material | Barium Titanate | 79.2 | 30,000 A | −55° C | 125° C | <<1K | −55° C | 125° C | 750 | — |
| | Calcium Stannate | 7.93 | 30,000 A | −14% | +10% | | 1.6 | 3.5 | | |
| | Bismuth Titanate | 11.88 | 30,000 A | | | | | | | |
| | $Mn(NO_3)_2$ (50% sol.) | 0.20 | | | | | | | | |
| | $Co(NO_3)_2 \cdot 6 H_2O$ | 0.79 | | | | | | | | |
| Addition | | | | | | | | | | |
| Glass | 75.8% $Bi_2O_5$ | 15 | 30,000 A | | | | | | | |
| | 24.2% PbO | | | | | | | | | |

Comments
1) Data in Table is for firing temperature of 1060° C for 4 hours.
2) Indication of reduction reaction in bodies, formed of above constituents, fired in rage of 1010° C to 1120° C.

II

| | | Parts by wt. | Particle Sizing | TC | | IR | DF | K | Life Test |
|---|---|---|---|---|---|---|---|---|---|
| Base Ceramic Material | Barium Titanate | 79.2 | 30,000 A | −55° C | 125° C | — | 2.3 | 2665 | — |
| | Calcium Stannate | 7.93 | 30,000 A | −31% | −10% | | | | |
| | Bismuth Titanate | 11.88 | 30,000 A | | | | | | |
| | $Mn(NO_3)_2$ (50% sol.) | 0.20 | | | | | | | |
| | $Co(NO_3)_2 \cdot 6 H_2O$ | 0.79 | | | | | | | |
| Addition | 100% CdO | 15.0 | 30,000 A | | | | | | |

Comments
1) Data in Table is for firing temperature of 1066° C (1950° F) for 4 hours.
2) Sound ceramic body, formed of above constituents, obtained in firing range of 1010° C (1850° F) to 1120° C (2050° F).

III

| | | Parts by wt. | Particle Sizing | TC | | IR | DF | K | Life Test |
|---|---|---|---|---|---|---|---|---|---|
| Base Ceramic Material | Barium Titanate | 79.2 | 1100 A | −55° C | 125° C | — | 0.80 | 1719 | — |
| | Calcium Stannate | 12 | 390 A | −4% | −17.5% | | | | |
| | Bismuth Titanate | 11.88 | 760 A | | | | | | |
| | $Mn(NO_3)_2$ (50% sol.) | 0.20 | | | | | | | |
| | $Co(NO_3)_2 \cdot 6H_2O$ | 0.79 | | | | | | | |
| Addition | 100% CdO | 10.4 | 30,000 A | | | | | | |

Comments
1) Data in Table is for firing temperature of 1066° C (1950° F) for 4 hours.
2) Sound ceramic body, formed of above constituents, obtained in firing range of 1010° C (1850° F) to 1120° C (2050° F).

IV

| | | Parts by wt. | Particle Sizing | TC | | IR | DF | K | Life Test |
|---|---|---|---|---|---|---|---|---|---|
| Base Ceramic Material | Barium Titanate | 79.2 | 1100 A | −55° C | 125° C | 90K | 0.75 | 2200 | DF, K satisfactory IR- 0.36K at 240 hours |
| | Calcium Stannate | 7.93 | 390 A | −15% | −21% | | | | |
| | Bismuth Titanate | 11.88 | 760 A | | | | | | |
| | $Mn(NO_3)_2$ (50% sol.) | 0.20 | | | | | | | |
| | $Co(NO_3)_2 \cdot 6H_2O$ | 0.79 | | | | | | | |
| Addition | 100 % CdO | 10.0 | 30,000 A | | | | | | |

Comments
1) Data in Table is for firing temperature of 1066° C (1950° F) for 4 hours.
2) Sound ceramic body, formed of above constituents, obtained in firing range of 1010° C (1850° F) to 1120° C (2050° F).

V

| | | Parts by wt. | Particle Sizing | TC | IR | DF | K | Life Test |
|---|---|---|---|---|---|---|---|---|
| Base Ceramic Material | Barium Titanate | 79.2 | 6000 A | — | — | — | — | — |
| | Calcium Stannate | 10 | 30,000 A | | | | | |
| | Bismuth Titanate | 11.88 | 30,000 A | | | | | |
| | $Mn(NO_3)_2$ (50% sol.) | 0.20 | | | | | | |
| | $Co(NO_3)_2 \cdot 6H_2O$ | 0.79 | | | | | | |
| Addition | | | | | | | | |
| Glass | 70% CdO | 10.2 | 30,000 A | | | | | |
| | 30% $Bi_2O_5$ | | | | | | | |

Comments
Sound ceramic body, formed of above constituent, could not be obtained at firing temperature of 1093° C (2000° F) and lower, i.e. did not sinter.

VI

| | | Parts by wt. | Particle Sizing | TC | IR | DF | K | Life Test |
|---|---|---|---|---|---|---|---|---|
| Base Ceramic Material | Barium Titanate | 79.2 | 6000 A | — | — | — | — | — |
| | Calcium Stannate | 10 | 30,000 A | | | | | |
| | Bismuth Titanate | 11.88 | 30,000 A | | | | | |
| | $Mn(NO_3)_2$ (50% sol.) | 0.20 | | | | | | |
| | $Co(NO_3)_2 \cdot 6 H_2O$ | 0.79 | | | | | | |
| Addition | | | | | | | | |
| Glass | 80% CdO | 10.2 | 30,000 A | | | | | |
| | 20% $Bi_2O_5$ | | | | | | | |

Comments
Sound ceramic body, formed of above constituents, could not be obtained at firing temperature of 1093° C (2000° F) and lower; i.e. did not sinter.

VII

| | | Parts by wt. | Particle Sizing | TC | IR | DF | K | Life Test |
|---|---|---|---|---|---|---|---|---|
| Base Ceramic Material | Barium Titanate | 79.2 | 6000 A | — | — | — | — | — |
| | Calcium Stannate | 10 | 30,000 A | | | | | |
| | Bismuth Titanate | 11.8 | 30,000 A | | | | | |
| | $Mn(NO_3)_2$ (50% sol.) | 0.20 | | | | | | |
| | $Co(NO_3)_2 \cdot 6H_2O$ | 0.79 | | | | | | |
| Addition | | | | | | | | |
| Glass | 90% CdO | 10.2 | 30,000 A | | | | | |
| | 10% $Bi_2O_5$ | | | | | | | |

Comments
Sound ceramic body, formed of above constituents, could not be obtained at firing temperatures of 1093° C (2000° F) and lower; i.e. did not sinter.

TABLE A-continued

| | | Parts by wt. | Particle Sizing | TC | | IR | DF | K | Life Test |
|---|---|---|---|---|---|---|---|---|---|
| | | | | VIII | | | | | |
| Base Ceramic Material | Barium Titanate | 79.2 | 6000 A | −55° C −16% | 125° C +40% | <1K | 5.0 | 845 | — |
| | Calcium Stannate | 12 | 30,000 A | | | | | | |
| | Bismuth Titanate | 4.88 | 30,000 A | | | | | | |
| | $Mn(NO_3)_2$ (50% sol.) | 0.20 | | | | | | | |
| Addition | $Co(NO_3)_2 \cdot 6H_2O$ | 0.79 | | | | | | | |
| Glass | 56 % CdO 46 % $Bi_2O_5$ | 20 | 30,000 A | | | | | | |

Comments
Data in Table is for firing temperature of 1040° C for 4 hours.

| | | | | IX | | | | | |
|---|---|---|---|---|---|---|---|---|---|
| Base Ceramic Material | Barium Titanate | 79.2 | 6000 A | −55° C −20% | 125° C +21% | 5K | 2.50 | 977 | — |
| | Calcium Stannate | 10 | 880 A | | | | | | |
| | Bismuth Titanate | 11.88 | 980 A | | | | | | |
| | $Mn(NO_3)_2$ (50% sol.) | 0.20 | | | | | | | |
| Addition | $Co(NO_3)_2 \cdot 6H_2O$ | 0.79 | | | | | | | |
| Glass | 54% CdO 46 % $Bi_2O_5$ | 10.2 | 30,000 A | | | | | | |

Comments
Data in Table is for firing temperature of 1090° C for 4 hours.

| | | | | X | | | | | |
|---|---|---|---|---|---|---|---|---|---|
| Base Ceramic Material | Barium Titanate | 79.2 | 6000 A | −55° C −22% | 125° C +20% | 1K | 2.00 | 723 | — |
| | Calcium Stannate | 10 | 880 A | | | | | | |
| | Bismuth Titanate | 11.88 | 980 A | | | | | | |
| | $Mn(NO_3)_2$ (50% sol.) | 0.20 | | | | | | | |
| Addition | $Co(NO_3)_2 \cdot 6H_2O$ | 0.79 | | | | | | | |
| Glass | 54 % CdO 46 % $Bi_2O_5$ | 10.2 | 30,000 A | | | | | | |

Comments
Data in Table is for firing temperature of 1040° C for 4 hours.

| | | | | XI | | | | | |
|---|---|---|---|---|---|---|---|---|---|
| Base Ceramic Material | Barium Titanate | 79.2 | 1100 A | −55° C −25% | 125° C −15% | 90K | 1.50 | 967 | — |
| | Calcium Stannate | 7.93 | 390 A | | | | | | |
| | Bismuth Titanate | 11.88 | 760 A | | | | | | |
| | $Mn(NO_3)_2$ (50% sol.) | 0.20 | | | | | | | |
| Addition | $Co(NO_3)_2 \cdot H_2O$ | 0.79 | | | | | | | |
| Glass | 54 % CdO 46 % $Bi_2O_5$ | 10.2 | 30,000 A | | | | | | |

Comments
1) Data in Table is for firing temperature of 1010° C for four hours.
2) Sound ceramic body, formed of above constituents, obtained in firing range of 955° C to 1120° C.

| | | | | XII | | | | | |
|---|---|---|---|---|---|---|---|---|---|
| Base Ceramic Material | Barium Titanate | 79.2 | 1100 A | −55° C −22% | 125° C −7% | 200K | 0.95 | 1143 | — |
| | Calcium Stannate | 10 | 880 A | | | | | | |
| | Bismuth Titanate | 11.88 | 980 A | | | | | | |
| | $Mn(NO_3)_2$ (50% sol.) | 0.20 | | | | | | | |
| Addition | $Co(NO_3)_2 \cdot 6H_2O$ | 0.79 | | | | | | | |
| Glass | 54 % CdO 46 % $Bi_2O_5$ | 10.2 | 30,000 A | | | | | | |

Comments
1) Data in Table is for firing temperature of 1038° C (1900° F) for 4 hours.
2) Sound ceramic body, formed of above constituents, obtained in firing range of 1010° C (1850° F) to 1093° C (2000° F).

| | | | | XIII | | | | | |
|---|---|---|---|---|---|---|---|---|---|
| Base Ceramic Material | Barium Titanate | 79.2 | 1100 A | −55° C −9.7% | 125° C −11% | 100K | 0.50 | 1012 | DF, IR, K satisfactory - IR at 2000 hours = 20K. |
| | Calcium Stannate | 10 | 380 A | | | | | | |
| | Bismuth Titanate | 11.88 | 980 A | | | | | | |
| | $Mn(NO_3)_2$ (50% sol.) | 0.20 | | | | | | | |
| Addition | $Co(NO_3)_2 \cdot 6 H_2O$ | 0.79 | | | | | | | |
| Glass | 54 % CdO 46 % $Bi_2O_5$ | 10.4 | 30,000 A | | | | | | |

Comments
1) Data in Table is for firing temperature of 1066° C (1950° F).
2) Sound ceramic body, formed of above constituents, obtained in firing range of 1010° C (1850° F) to 1093° C (2000° F).

| | | | | XIV | | | | | |
|---|---|---|---|---|---|---|---|---|---|
| | | | | −55° C | 125° C | | | | |
| Base Ceramic Material | Barium Titanate | 79.2 | 1100 A | (A) −21% | −16% | <1K | 1.37 | 1519 | — |
| | Calcium Stannate | 10 | 880 A | (B) −17% | −18% | 140K | 0.77 | 1507 | |
| | Bismuth Titanate | 11.88 | 980 A | (C) −16% | −18% | — | 1.87 | 1432 | IR at 2000 hours = > 10 megohm-UF |
| | $Mn(NO_3)_2$ (50% sol.) | 0.20 | | | | | | | |
| Addition | $Co(NO_3)_2 \cdot 6H_2O$ | 0.79 | | | | | | | |

TABLE A-continued

| | | Parts by wt. | Particle Sizing | | TC | | IR | DF | K | Life Test |
|---|---|---|---|---|---|---|---|---|---|---|
| Glass | 70 % CdO<br>30% Bi₂O₅ | 10.2 | 30,000 A | | | | | | | |

Comments
(A) Data in Table is for firing temperature of 982° C (1800° F) for 4 hours.
(B) Data in Table is for firing temperature of 1038 ° C (1900° F) for 4 hours.
(C) Data in Table is for firing temperature of 1093 ° C (2000° F) for 4 hours.

XV

| | | Parts by wt. | Particle Sizing | | TC −55° C | 125° C | IR | DF | K | Life Test |
|---|---|---|---|---|---|---|---|---|---|---|
| Base Ceramic Material | Barium Titanate | 79.2 | 1100 A | (A) | −21% | −15% | <1K | 1.67 | 1182 | — |
| | Calcium Stannate | 10 | 880 A | (B) | −16% | −18% | 100K | 0.57 | 1166 | — |
| | Bismuth Titanate | 11.88 | 980 A | (C) | −19% | −20% | — | 0.84 | 1341 | — |
| Addition | $Mn(NO_3)_2$ (50% sol.) | 0.20 | | | | | | | | |
| | $Co(NO_3)_2 \cdot 6H_2O$ | 0.79 | | | | | | | | |
| Glass | 80% CdO<br>20% Bi₂O₅ | 10.2 | 30,000 A | | | | | | | |

Comments
(A) Data in Table is for firing temperature of 982° C (1800° F) for four hours.
(B) Data in Table is for firing temperature of 1038° C (1900° F) for four hours.
(C) Data in Table is for firing temperature of 1093° C (2000° F) for four hours.

XVI

| | | Parts by wt. | Particle Sizing | | TC −55° C | 125° C | IR | DF | K | Life Test |
|---|---|---|---|---|---|---|---|---|---|---|
| Base Ceramic Material | Barium Titanate | 79.2 | 1100 A | (A) | −22% | −18% | 10K | 1.67 | 973 | — |
| | Calcium Stannate | 10 | 880 A | (B) | −19% | −15% | 30K | 0.97 | 1060 | — |
| | Bismuth Titante | 11.88 | 980 A | (C) | −20% | −20% | — | 0.83 | 1207 | — |
| Addition | $Mn(NO_3)_2$ (50% sol.) | 0.20 | | | | | | | | |
| | $Co(NO_3)_2 \cdot 6H_2O$ | 0.79 | | | | | | | | |
| Glass | 90% CdO<br>10 % Bi₂O₅ | 10.2 | 30,000 A | | | | | | | |

Comments
(A) Data in Table is for firing temperature of 982° C (1800° F) for 4 hours.
(B) Data in Table is for firing temperature of 1038° C (1900° F) for 4 hours.
(C) Data in Table is for firing temperature of 1093° C (2000° F) for 4 hours.

XVII

| | | Parts by wt. | Particle Sizing | TC −55° C | 125° C | IR | DF | K | Life Test |
|---|---|---|---|---|---|---|---|---|---|
| Base Ceramic Material | Barium Titanate | 79.2 | 1100 A | −17% | −17% | 90K | 0.50 | 1102 | — |
| | Calcium Stannate | 10. | 880 A | | | | | | |
| | Bismuth Titanate | 12. | 588 A | | | | | | |
| Addition | $Mn(NO_3)_2$ (50% sol.) | 0.20 | | | | | | | |
| | $Co(NO_3)_2 \cdot 6H_2O$ | 0.79 | | | | | | | |
| Glass | 33.3% CdO<br>66.7% Bi₂O₅ | 10.4 | 30,000 A | | | | | | |

Comments
Data in Table is for firing temperature of 1038° C for 4 hours.

XVIII

| | | Parts by wt. | Particle Sizing | TC −55° C | 125° C. | IR | DF | K | Life Test |
|---|---|---|---|---|---|---|---|---|---|
| Base Ceramic Material | Barium Titanate | 79.2 | 1100 A | −10% | −10% | 100K | 0.58 | 629 | — |
| | Calcium Zirconate | 12. | 270 A | | | | | | |
| | Bismuth Titanate | 12. | 588 A | | | | | | |
| Addition | $Mn(NO_3)_2$ (50% sol.) | 0.20 | | | | | | | |
| | $Co(NO_3)_2 \cdot 6H_2O$ | 0.79 | | | | | | | |
| Glass | 54 % CdO<br>46 % Bi₂O₅ | 10.4 | 30,000 A | | | | | | |

Comments
1) Data in Table is for firing temperature of 1038° C for 4 hours.
2) Data is for single plate type capacitor, not monolithic type.

XIX

| | | Parts by wt. | Particle Sizing | TC −55° C | 125° C | IR | DF | K | Life Test |
|---|---|---|---|---|---|---|---|---|---|
| Base Ceramic Material | Barium Titanate | 79.2 | 1100 A | −16% | −18% | 130K | 0.58 | 1147 | — |
| | Calcium Stannate | 12. | 880 A | | | | | | |
| | Bismuth Titanate | 12. | 588 A | | | | | | |
| Addition | $Mn(NO_3)_2$ (50% sol.) | 0.20 | | | | | | | |
| | $Co(NO_3)_2 \cdot 6H_2O$ | 0.79 | | | | | | | |
| Glass | 54 % CdO<br>46 % Bi₂O₅ | 30 | 30,000 A | | | | | | |

Comments
Data in Table is for firing temperature of 1093° C for 4 hours.

With reference to Table A, and test sample I, barium titanate material in mixture with other base ceramic materials and mixed with a lead oxide containing glass was fired at the indicated temperatures. Measured values of IR and DF show that a useful ceramic capacitor was not obtained. Test sample II shows that, using the same constituents as in test sample I, except that cadmium oxide was substituted for the lead oxide containing glass, substantially improved DF and K were obtained; test samples III and IV using CdO show similar improvement. The Life Test for sample IV showed and IR of 0.36K at 240 hours which is acceptable in applications where a small amount of D.C. leakage can be tolerated such as decoupling in home entertainment systems. Test samples V, VI, and VII, using coarse barium titanate materials with a lead-free CdO+Bi₂O₃ ceramic, in amounts of 10.2 parts by weight, did not result in a mature ceramic body at firing temperatures up to 1090° C; however, upon increasing the amount of lead-free ceramic to 20 parts by weight, (test sample VIII) firing at 1040° C produced a mature ceramic body having the electrical properties indicated which show utility for ceramic capacitor applications where a small amount of D.C. leakage is acceptable such as decoupling in home entertainment systems. By using finer sizing for the modifier materials (tet sample IX), a lesser amount of lead-free ceramic (10.2 parts by weight) can be used to obtain a fired ceramic capacitor at a firing temperature of 1090° C. Test sample X illustrates the effect of a lower firing temperature on the properties of the ceramic capacitor of test sample IX. For test sample XI, all of the base ceramic material constituents were fine sized and, using 10.2 parts by weight of lead free $CdO + Bi_2O_3$ ceramic, a good quality ceramic capacitor was obtained at firing temperatures of 1010° C and for temperatures in the range of 955° to 1120° C. Test sample XII differing from test sample XI in the sizing and amounts of the calcium stannate modifier provided comparable results. Test sample XIII, in which the particle size of the calcium stannate modifier of test sample XII has been decreased shows very good results in all respects including a 2000 hour Life Test. Test samples XIV, XV and XVI show the effect of increased amounts of CdO in the lead-free ceramic using the formulation of test sample XII. Increasing the amount of CdO from 54% to 70% resulted in increased K and enables some control of TC. Test samples XVII through XIX illustrate additional capacitors in accordance with the present invention.

Further in connection with the present invention it is to be noted that fine particles, i.e., substantially all not more than 2500 A, for the base ceramic materials provides optimum properties in the fired ceramic and this is the preferred embodiment of the present invention. The particles should be substantially all not more than 2500 A, e.g. at least 90% not more than about 2500 A. With increasing fineness of the base ceramic material increased improvement is achieved. An important feature of the present invention is that the base ceramic materials and the cadmium oxide-containing ceramic material be lead-free in order to achieve sound and stable fired ceramic bodies when using unfired base ceramic materials. The ability to use unfired mixtures of base ceramic materials is producing fired ceramic bodies at low firing temperature is an important aspect of the present invention in making ceramic bodies in combination with relatively inexpensive metals and alloys which are non-reactive with the ceramic constituents at temperature below about 1120° C, such as nickel-silver alloys. A further important feature of the present invention is that when the cadmium oxide-containing ceramic material includes bismuth oxide, the material can be used in the form of a glass, or as a mechanical mixture.

A preferred cadmium oxide-containing material for use in the present invention to provide an excellent combination of electrical properties is a glass containing from about 30 to 80% by weight cadmium oxide and about 20 to 70% by weight bismuth oxide.

The following examples V to XIV describe the preparation of finely divided barium titanate, and other materials as set forth in co-pending U.S. patent application Ser. No. 481,321. Such materials are useful as a base ceramic material in accordance with the present invention.

EXAMPLE V

The purpose of this example is to demonstrate the preparation of sub-micron size barium titanate powder. The solution used in this example was prepared in the following way: an aqueous solution of tetraisopropyl titanate was first prepared by slowly adding 100 g of tetraisopropyl titanate to 200g of glacial acetic acid with agitation. The whole solution was then added slowly to 700 g of water with agitation. The aqueous solution of tetraisopropyl titanate so prepared ws then added to and thoroughly mixed with about one liter of corn syrup (Globe), 89.4g of anhydrous barium acetate were then separately dissolved in enough water to obtain complete dissolution. The barium acetate solution was then added to and thoroughly mixed with the tetraisopropyl titanate corn syrup solution. The resulting solution was then heated on a hot plate until dry. During this process, the solution was converted into a char. The resulting char was then ignited in a furnace at 600° C with an excess of air until all the carbonaceous material was burned off. The resulting powder was characterized by x-ray diffraction to be barium titanate. Its crystallite size was estimated from x-ray line broadening to be in the 510 A range.

EXAMPLE VI

The purpose of this example is to demonstrate the preparation of sub-micron size barium titanate powder. The solution used in this example was prepared in the following way: 22.22g of anhydrous barium acetate were dissolved into 50cc of water, 213.5g of corn syrup (Isomerose) were added to and thoroughly mixed with that solution, 50g of 80 wt.% triethanolamine titanate in isopropanol was then added to and thoroughly mixed with the barium acetate - corn syrup solution. In the same manner as in Example V the resulting solution was converted to a char, which was then ignited at 600° C in air. The resulting powder was characterized by x-ray diffraction to be barium titanate. Specific surface area of the powder was measured by B.E.T. to equal 17 $m^2/g$. Crystallite size of the powder was estimated from x-ray line broadening to be in the 310 A range.

EXAMPLE VII

The purpose of this example is to demonstrate the preparation of sub-micron size barium titanate powder. The solution used in this example was prepared in the following way: 100g of reagent grde sucrose was dissolved in 150 cc of warm water, 22.22 g. of anhydrous barium acetate was added and dissolved into the sucrose solution, 50g of 80 wt.% triethanolamine titanate in isopropanol were then added to and thoroughly mixed with the barium acetate-sucrose solution. In the same manner as in example V, the resulting solution was converted to a char, the char was then ignited at 600° C in air. The resulting powder ws characterized by x-ray diffraction to be barium titanate. Specific surface area of the powder was measured by B.E.T. to equal 17.2 $m^2/g$. Crystallite size of the powder was estimated from x-ray line broadening to be in the 360 A range.

EXAMPLE VIII

The purpose of this example is to demonstrate the preparation of sub-micron size barium titanate powder containing 10% by weight calcium zirconate. The solution used in this example was prepared in the following way: 500g of commercial sucrose was dissolved into 750cc of warm water, 111.5g of anhydrous barium acetate was added and dissolved into the sucrose solution, 250g of 80wt.% triethanolamine titanate in isopropanol were then added to and thoroughly mixed with the resulting solution, 41.1cc of an aqueous solution of calcium acetate (containing 3.49g CaO) previously prepared by dissolving 955g of anhydrous calcium acetate in enough water to yield 4 liters of solution and assayed to contain 84.5g of CaO per liter of solution, were added to and thoroughly mixed with the sucrose solution; 21cc of aqueous zirconium acetate solution (containing 7.57g of $ZrO_2$) was added and thoroughly mized with the sucrose solution. In the same manner as in Example V, the resulting aqueous mixture was converted to a char. The char was then ignited at 600° C. The resulting powder ws characterized by x-ray diffraction to be barium titanate with calcium zirconate in solid solution. Specific surface area of the powder was measured to equal 20.85 $m^2/g$. Crystallite size of the powder was estimated from x-ray line broadening to be in the 235 A range.

EXAMPLE IX

The purpose of this example is to demonstrate the preparation of sub-micron size barium titanate powder containing 13 wt.% bismuth titanate. The solution used in this example was prepared in the following way: 600g of commercial sucrose was dissolved in 800cc of warm water, 111.5g of anhydrous barium acetate was added to and dissolved into that solution, 278.4g of 80 wt.% triethanolamine titanate in isopropanol was then added to and thoroughly mixed with the sucrose solution, 48.2g of bismuth ammonium citrate solution, containing 11.55g of $Bi_2O_3$, was added to the sucrose solution. Upon addition of the bismuth ammonium citrate solution, a gelatinous precipitate formed which was dissolved by heating the mixture ot 74° C. In the same manner as in Example V, the resulting solution was converted to a char. The char was then ignited at 600° C in air. The resulting powder was characterized by x-ray diffraction to be barium titanate with bismuth titanate in solid solution. Specific surface area of the powder was measured to equal 18.8 $m^2/g$. Crystallite size of the powder was estimated from x-ray line broadening to be in the 270 A range.

EXAMPLE X

The purpose of this example is to demonstrate the preparation of sub-micron size barium titanate powder containing 9 wt.% of calcium stannate. The solution used in this example was prepared in the following way: 600g of commercial sucrose was dissolved into 750cc of warm water, 111.5g of anhydrous barium acetate was added to and dissolved into the solution, 250g of 80 wt.% triethanolamine titanate in isopropanol was then added to and thoroughly mixed with the sucrose solution, 32.6cc of calcium acetate solution, containing 2.77g of CaO, as used in Example VIII was then added to and thoroughly mixed with the sucrose solution, 350cc of glacial acetic acid containing 6.645g SnO in solution, was then added to and thoroughly mixed with the sucrose solution. In the same manner as in Example V, the resulting mixture was converted to a char. The char was then ignited at 600° C in air. The resulting powder was characterized by x-ray diffraction to be barium titanate with calcium stannate in solid solution. Specific surface area of the powder was measured to equal 22.95 $m^2/g$. Crystallite size of the powder was estimated from x-ray line broadening to be in the 250 A range.

EXAMPLE XI

The purpose of this example is to demonstrate the preparation of sub-micron size barium titanate powder containing 11.9 wt.% bismuth titanate, 7.9 wt.% calcium stannate, 0.8 wt.% cobalt oxide and 0.2 wt.% manganese oxide. The solution used in this example was prepared in the following way: 600g of commercial sucrose was dissolved into 750cc of warm water 111.5g of anhydrous barium acetate was added to and dissolved into that solution, 0.325cc of manganous nitrate 50 wt.% solution was added to and thoroughly mixed with the sucrose solution, 278.4g of 80 wt.% triethanolamine titanate in isopropanol was then added to and thoroughly mixed with the sucrose solution, 0.86g of hydrous cobalt acetate was added to and dissolved in the sucrose solution, 48.2g of bismuth ammonium citrate solution, containing 11.55g of $Bi_2O_3$, was added to and thoroughly mixed to the solution in the same way as described in Example 18, 30.9cc of calcium acetate solution containing 2.62g of CaO, as used in Example VIII was added to and thoroughly mixed with the sucrose solution, 500cc of glacial acetic acid containing 5.82g Sn in solution, was then added to and thoroughly mixed with the solution. In the same manner as in Example V, the resulting solution was converted to a char. The char was then ignited at 600° C in air. The resulting powder was characterized by x-ray diffraction to be barium titanate with the oxide additives in solid solution. Specific surface area of the powder was measured to equal 19.87 $m^2/g$. Crystallite size of the powder was estimated from x-ray line broadening to be in the 250 A range.

EXAMPLE XII

The purpose of this example is to demonstrate the preparation of sub-micron size barium titanate powder containing 2.5% by weight sodium bismuth titanate ($NaBi_9Ti_8O_{30}$). The solution used in this example was prepared in the following way: 500g of commercial sucrose was dissolved into 500cc of warm water, 104g of anhydrous barium acetate was added and dissolved into the sucrose solution, 238.26g of 80 wt.% triethanolamine titanate in isopropanol were then added to and thoroughly mixed with the resulting solution, 0.148g of anhydrous sodium acetate was added to and dissolved in the sucrose solution, 15.81g of bismuth ammonium citrate solution, containing 3.788g of $Bi_2O_3$, was added to and thoroughly mixed with the solution. Upon addition of the bismuth ammonium citrate solution, a gelatinous precipitate formed which was dissolved by heating the mixture to 74° C. The resulting solution was converted to a char by heating, and the char was then ignited at 600° C in air. The resulting powder was characterized by x-ray diffraction to be barium titanate with the oxide additions in solid solution. Specific surface area of the powder was measured to equal 13.04 $m^2/g$. Crystallite size of the powder was estimated from x-ray line broadening to be in the 450 A range.

EXAMPLE XIII

The purpose of this example is to demonstrate the preparation of sub-micron size barium titanate powder containing 1 wt.% of chromium oxide. The solution used in this example was prepared in the following way: 220g of anhydrous barium acetate was dissolved into one liter of water, 1500g of corn syrup was added to and thoroughly mixed with the barium acetate solution, 500g of 80 wt.% triethanolamine titanate in isopropanol was then added to and thoroughly mixed with the resulting solution; the resulting solution was then divided into two equal parts and 3.25g of chromium acetate was added to and dissolved into one of the equal parts. The resulting solution was converted to a char by heating and the char was then ignited at 600° C in air. The resulting powder was characterized by x-ray diffraction to be barium titanate doped with chromium oxide. Specific surface area of the powder was measured to equal 7.72 m$^2$/g. Crystallite size of the powder was estimated from x-ray line broadening to be in the 600 A range.

EXAMPLE XIV

A further series of experiments were conducted in accordance with the teachings of the previous examples illustrate manufacture of diverse mixed oxides in highly reactive, high surface area forms. The results of this series are summarized in Table B.

TABLE B

| | Oxide | Starting Materials | Stoichiometry | Surface Area |
|---|---|---|---|---|
| V | $CaSnO_3$ | Stannous Acetate, Sugar, Calcium Acetate | 1.19 | 40.5 m$^2$/g |
| VI | $CaSnO_3$ | Stannous Tartrate dissolved in acetic acid solution, sugar, Calcium Acetate | 0.91 | 25.1 m$^2$/g |
| VII | $CaSnO_3$ | Stannous Acetate, Sugar, Calcium Acetate | 0.84 | 15.1 m$^2$/g |
| VIII | $Bi_2O_3 \cdot 2TiO_2$ | Bismuth Ammonium Citrate, Sugar, Tyzor TE* | 1.96 | 10.3 m$^2$/g |
| IX | $Bi_2O_3 \cdot 2TiO_2$ | Bismuth Ammonium Citrate, Sugar, Tyzor TE* | 2.01 | 7.9 m$^2$/g |
| X | $Bi_2O_3 \cdot 2TiO_2$ | Bismuth Ammonium Citrate, Sugar, Tyzor TE* | | 23.5 m$^2$/g |
| XI | $CaZrO_3$ | Calcium Acetate, Corn Syrup, Zirconium Nitrate | | 32.9 m$^2$/g |
| XII | $CaZrO_3$ | Calcium - EDTA Complex, Sugar, Zirconium Acetyl Acetate | | 22.1 m$^2$/g |
| XIII | $CaZrO_3$ | Zirconium Acetyl Acetate-Complex with Triethanolamine, Sugar, Calcium Acetate | | 46.8 m$^2$/g |
| XIV | $Nd_2O_3 \cdot 2TiO_2$ | Neodymium Acetate, Sugar, Tyzor TE* | 2.042 | 25.1 m$^2$/g |

*DuPont tradename for tetraethanolamine titanate in isopropyl alcohol.

The foregoing examples V to XV illustrate the production of fine powders for use as base ceramic material in accordance with the present invention. Through the use of ball-milling the powders can be reduced to particles of the size of the crystallites recited in the above-noted Examples.

What is claimed is:

1. A ceramic capacitor comprising in combination a lead-free dielectric ceramic body in the form of a mixture fired and matured at a maturing temperature not higher than about 1120° C. said mixture before firing consisting essentially of a mixture of the following ceramic materials (i) from 60 to 95% by weight of uncalcined lead free base ceramic material sized not larger than about 2500 A and (ii) about 5 to 40% by weight of lead-free cadmium oxide-containing ceramic material, and electrode material formed on said body in capacitive relationship said base ceramic material not being subjected to a temperature as high as said maturing temperature for any substantial period of time prior to firing and said maturing temperature of said mixture being substantially higher than any temperature to which said mixture has been previously subjected.

2. A method of forming a monolithic multilayer lead-free ceramic capacitor comprising the steps of forming a green ceramic body from a mixture consisting essentially of the following ceramic materials (i) from about 5 to 40% by weight of lead-free cadmium oxide-containing ceramic material and (ii) about 60–95% by weight of uncalcined lead-free base ceramic material sized not larger than about 2500 A, applying metal electrodes to said green ceramic body, stacking a plurality of said green ceramic bodies and maturing said electrodes at a maturing temperature not higher than about 1120° C, said base ceramic material not being subjected to a temperature as high as said maturing temperature for any substantial period of time prior to firing and said maturing temperature of said mixture being substantially higher than any temperature to which said mixture has been previously subjected.

3. A ceramic capacitor in accordance with claim 1 wherein said base ceramic material is selected from the group consisting of titanates, niobates, zirconates, stannates, alumina, rare earth oxides and unfired mixtures of such materials.

4. A ceramic capacitor in accordance with claim 1 wherein said base ceramic material is predominantly barium titanate.

5. A method in accordance with claim 2 wherein the particle sizing of said base ceramic material is not more than about 2500 A.

6. A method in accordance with claim 2 wherein said base ceramic material is selected from the group consisting of titanates, niobates, zirconates, stannates, alumina, rare earth oxides and unfired mixtures of such materials.

7. A method in accordance with claim 2 wherein said base ceramic material is predominantly barium titanate.

8. A ceramic capacitor in accordance with claim 1 wherein the lead-free cadmium oxide containing material consists essentially of about 30 to 80% by weight cadmium oxide and about 20 to 70% by weight bismuth oxide.

9. A method in accordance with claim 2 wherein the lead-free cadmium oxide containing material consists essentially of about 30 to 80% by weight cadmium oxide and about 20 to 70% by weight bismuth oxide.

* * * * *